United States Patent Office 3,338,888
Patented Aug. 29, 1967

3,338,888
RIFAMYCIN TYPE ANTIBIOTIC COMPOUNDS
Hans Bickel, Binningen, Switzerland, Istvan Furész and Gian Gualberto Gallo, Milan, Italy, Friedrich Kradolfer, Basel, and Wilhelm Kump, Binningen, Switzerland, and Piero Sensi, Milan, Italy, assignors to Ciba Limited, Basel, Switzerland, a Swiss company, and Lepetit S.p.A., Milan, Italy, a company of Italy, jointly
No Drawing. Filed Sept. 29, 1964, Ser. No. 400,198
Claims priority, application Switzerland, Oct. 11, 1963, 12,540/63; July 31, 1964, 10,045/64; Sept. 10, 1964, 11,797/64
33 Claims. (Cl. 260—239.3)

The present invention concerns new antibiotically active compounds, which are distinguished from rifamycin O, which according to the articles in Experientia 20 (1964), 336, 339 and 343 has the formula

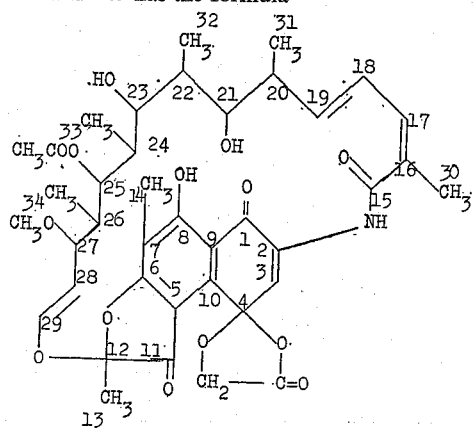

by having instead of its partial formula

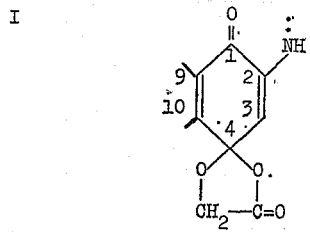

one of the partial formulae IIa 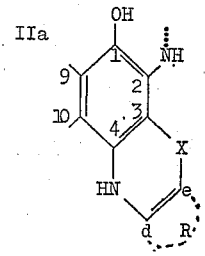 or IIb 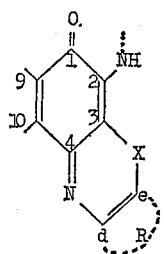

in which X stands for NH or O and R represents together with the carbon atoms d and e the residue of a carbocyclic aromatic or of a heterocyclic aromatic compound, and their 16, 17, 18 and 19-tetrahydro-derivatives. The above Formula IIb encompasses also, for X=NH, the tautomeric forms of the structure

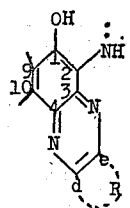
IIc R represents together with the carbon atoms d and e above all an arylene, such as phenylene or naphthylene radical, or a pyridylene or pyrimidylene radical, which may also be mono or polysubstituted. The substituents are for example the hydroxy, mercapto, lower alkyl, lower alkoxy, lower alkylthio, nitro, amino, carboxyl, sulpho or cyano groups or halogen atoms. There are to be mentioned especially the following compounds of the above Formula IIb, in which (1) X=NH, edR=phenylene
(2) X=NH, edR=phenylene substituted by chlorine in p-position to e or d
(3) X=NH, edR=pyridylene of the formula

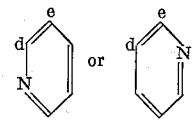

(4) X=NH, edR=pyrimidylene of the formula

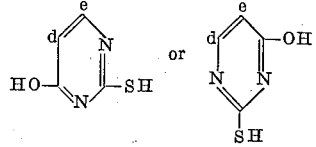

(5) X=NH, edR=phenylene substituted by methyl in p-position to e or d
(6) X=NH, edR=phenylene substituted by methyl in o-position to e or d
(7) X=NH, edR=phenylene substituted by ethyl in o-position to e or d
(8) X=NH, edR=phenylene substituted in each of the p-positions to e and d by methyl
(9) X=NH, edR=naphthylene of the formula

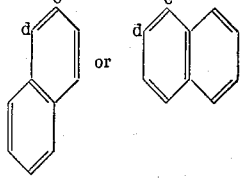

(10) X=O, edR=phenylene
(11) X=O, edR=phenylene substituted by chlorine in p-position to e
(12) X=O, edR=phenylene substituted by a nitro group in p-position to e
(13) X=O, edR=phenylene substituted by chlorine in o-position to e and by a nitro group in p-position to d
(14) X=O, edR=phenylene substituted by a carboxyl group in o-position to d
(15) X=O, edR=naphthylene of the formula

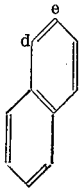

(16) X=O, edR=phenylene substituted by methyl in o-position to e
(17) X=O, edR=phenylene substituted by methyl in p-position to d
(18) X=O, edR=phenylene substituted by methyl in p-position to e
(19) X=NH, edR=tetrahydronaphthylene of the formula

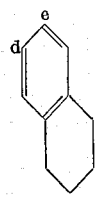

(20) The 16, 17, 18, 19-tetrahydro-derivatives of the above compound 1, as well as their hydroquinoid derivatives corresponding to Formula IIa, which will be designated with the corresponding numbers 1'–20'.

Of special importance is the above named compound, having the formula

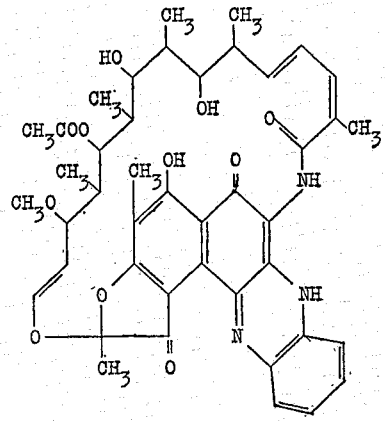

or, in its tautomeric form

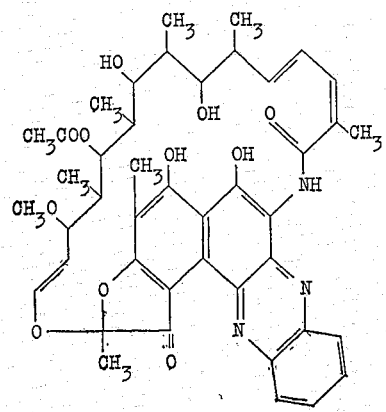

and which is designated as rifamycin PH.

The new compounds are deep colored products. The quinones (IIb) as well as hydroquinones (IIa) are easy to convert into each other. By treatment with alkali both types of compounds yield water-soluble salts: They are preferably made from the quinoid form b, when X=NH in Formula II; whereas the hydroquinoid form a is preferred for their formation when X=O in Formula II. Where the products according to one of the said formulae IIa or IIb contain basic substituents, they may also form acid addition salts. There are primarily used for this purpose acids suitable for the formation of therapeutically acceptable salts. As such acids there may be mentioned, for example, hydrohalic acids, sulphuric acids, phosphoric acids, nitric acid, perchloric acid; aliphatic, alicyclic, aromatic or heterocyclic carboxylic or sulphonic acids, such as formic, acetic, propionic, succinic, glycollic, lactic, malic, tartaric, citric, ascorbic, maleic, hydroxymaleic or pyroracemic acid; phenylacetic, benzoic, p-aminobenzoic, anthranilic, p-hydroxybenzoic, salicyclic, p-aminosalicylic or embonic acid, methanesulphonic, ethanesulphonic, hydroxyethanesulphonic, ethylenesulphonic acid; halobenzenesulphonic, toluenesulphonic, naphthalenesulphonic acids or sulphanilic acid; methionine, tryptophan, lysine or arginine.

These or other salts of the new compounds, such as for example the picrates, can also be used for purifying the bases obtained, by converting the bases into salts, separating the latter and liberating the bases from the salts again. Owing to the close relationship between the bases in free form and in the form of their salts, there are to be understood as being correspondingly and appropriately included, under the free bases in the foregoing and hereinafter, if required, also the corresponding salts.

The compounds of the Formula IIa and IIb, their 16, 17, 18, 19-tetrahydro-derivatives, mixtures thereof and their salts are distinguished by their antibiotic activity. Thus they exhibit a high antibacterial activity against Gram-positive bacteria and tubercle bacilli and a good activity against Gram-negative bacteria. An especially pronounced action is shown by the above named rifamycin PH, which is superior, in vitro as well as in vivo, to comparable known antibiotics, such as rifamycin SV, as can be seen from the following tables:

IN VITRO ACTIVITY OF RIFAMYCIN PH AS COMPARED TO RIFAMYCIN SV. MINIMUM INHIBITING CONCENTRATION IN γ/ML.

| Organism | Rifamycin | |
| --- | --- | --- |
|  | PH | SV |
| S. aureus 10 | 0.06 | 0.01 |
| S. aureus 14 | <0.008 | 0.06–0.008 |
| S. aureus 3 | <0.008 | 0.008 |
| S. aureus 2977 | 0.4 | 0.025 |
| S. aureus 19(PV 43) | <0.008 | 0.025 |
| S. aureus 2999 | <0.008 | 0.06–0.01 |
| Str. faecalis 51 | 1.5 | 30 |
| E. coli 203 | 30 | 125–250 |
| E. coli 205 | 30 | 125–250 |
| E. coli 209 | 15 | 125–250 |
| Salmonella 271 | 15 | 125–250 |
| Salmonella 273 | 25 | 125 |
| Salmonella 277 | 15 | 250 |
| Klebsiella 327 | 30 | 125 |
| Ps. aer. 313 | 30 | 125 |
| Ps. aer. 314 | 30 | 125 |
| Proteus 248 | 3 | 60 |
| Proteus 253 | 12.5 | 125–250 |
| Tbc (Ravenel) | 0.03 | 0.03 |

S.=Staphylococcus; Str.=Streptococcus; E.=Escherichia; Ps. aer.= Pseudomonas aeruginosa; Tbc=Mycob. tuberculosis.

CHEMOTHERAPY ON MICE WITH RIFAMYCIN PH AND RIFAMYCIN SV $ED_{40-70}$ IN MG./KG. AFTER ONE SINGLE ADMINISTRATION

| Organism | Rifamycin PH | | Rifamycin SV | |
| --- | --- | --- | --- | --- |
|  | P.o. | S.c. | P.o. | S.c. |
| S. aureus 10 | 0.5–1 | 0.25–0.5 | 70–150 | 10–15 |
| S. aureus 2977 |  | 0.1 |  |  |
| E. coli 205 |  | 250 |  | )500 |
| Salm. typh. 273 |  | 100 |  | )500 |
| Klebsiella 327 |  | 100 |  | )500 |
| Ps. aer. 313 |  | 100 |  | 250–500 |

S.=Staphylococcus; E.=Escherichia; Salm. typh.=Salmonella typhimurium; Ps. aer.=Pseudomonas aeruginosa.

Another advantage of rifamycin PH consists in the fact that high blood levels and a good organ distribution is attained upon oral administration. Following are representative results obtained on mice with refamycin PH in oral doses of 10 and 20 mg./kg.

| Time | Blood serum (γ/ml.) | | Liver (γ/g.) | | Kidney (γ/g.) | | Lung (γ/g.) | | Spleen | |
|---|---|---|---|---|---|---|---|---|---|---|
| | 10 mg./kg. | 20 mg./kg. | 10 mg./kg. | 20 mg./kg. | 10 mg./kg. | 20 mg./kg. | 10 mg./kg. | 20 mg./kg. | 10 mg./kg. | 20 mg./kg. |
| 1ʰ | 3.75 | 10.22 | 30.45 | 43.20 | 0.65 | 1.15 | 0.45 | 1.0 | 0 | 0.9 |
| 2ʰ | 12.18 | 12.02 | 27.60 | 39.65 | 1.40 | 1.55 | 1.55 | 1.65 | 1.1 | 1.3 |
| 5ʰ | <0.2 | 0.31 | 2.95 | 15.50 | <0.05 | <0.05 | <0.05 | <0.05 | <0.05 | <0.05 |
| 8ʰ | <0.2 | ~0.19 | <0.05 | 9.40 | <0.05 | <0.05 | <0.05 | <0.05 | <0.05 | <0.05 |

Besides their use as antibiotics the compounds of the present invention are also suitable as additives to animal fodders and for preserving victuals.

The new compounds are obtained when rifamycin O or rifamycin S or one of their 16, 17, 18, 19-tetrahydro derivatives is reacted with a compound of the Formula III

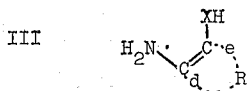

in which R and X have the above meanings, and, if desired, in any order of succession a resulting hydroquinone is oxidized to the quinone and/or a resulting quinone is reduced to the hydroquinone and/or a compound obtained is reduced to its 16, 17, 18, 19-tetrahydro-derivative by treatment with catalytically activated hydrogen, and, if desired, the resulting compound is converted into a salt thereof.

Depending on the conditions used in the reaction and isolation the desired reaction product is obtained as a quinone (IIb) or a hydroquinone (IIa). These two forms are easy to convert one into the other by reduction or oxidation and may thus be distinguished on this feature. Oxidation can be achieved even with atmospheric oxygen. The reduction may be performed, for example, with ascorbic acid or a dithionite.

The condensation starting from rifamycin O is carried out in the presence of a solvent, preferably of a polar solvent or mixture of polar solvents, for instance in chloroform-methanol-water, n-butanol saturated with water, dioxane, tetahydrofuran or mixtures thereof with methanol and/or water. The condensation is carried out at room temperature or, if necessary, at elevated temperature (e.g., on the steam bath). The end of the reaction or the maximum yield can be determined by thin- layer chromatography. Besides the desired condensation product the reaction mixture may contain reduced starting material, viz., rifamycin B. The condensation product can be purified by fractionated extraction, by absorption chromatography and/or by crystallization or by reprecipitation from methanol-water.

If the condensation is made with rifamycin S, equivalent amounts of it and of the other condensation component are dissolved in a non-polar solvent (benzene, toluene, ether, etc.) and the solution is allowed to stand until all rifamycin S has reacted. This generally takes several days. It is possible to shorten the reaction time by heating. The solution then contains besides the desired condensation product also rifamycin SV and oxidized reagent. In order to obtain the pure condensation product it is advisable to carry out a preliminary purification as follows:

(A) With condensation products of the phenoxazine type (X=O in Formulae II) the residue obtained after evaporation of the reaction mixture is dissolved in methanol or acetone and the condensation product is precipitated by the cautious addition of a concentrated solution of sodium carbonate, while rifamycin SV and also other impurities remain in the solution.

(B) With condensation products of the phenazine type (X=NH in Formulae II) the above mentioned reprecipitation from methanol or acetone has to be carried out with water instead of sodium carbonate solution, owing to the greater acidity of these compounds. When the enriched condensation products obtained by this reprecipitation do not crystallize directly, an absorption chromatography may be carried out afterwards. This is necessary in the case in which there is obtained a mixture of isomeric condensation products owing to the asymmetry of the condensing reagent used, and where a separation of the two components is aimed at. There can be used silica gel as adsorbing agent, which has been treated previously with a 1–2% solution of glacial acetic acid in chloroform. As eluting agent chloroform with 1% glacial acetic acid is used in the case of the phenazine compounds, and chloroform with 5% acetone in the case of the phenoxazine compounds. As a rule 1 kg. silica gel is sufficient for the chromatography of about 20 g. of crude condensation product.

In the majority of the cases it is advantageous to carry out a filtration through short columns of silica gel before the actual purification is effected. Isomeric mixtures of phenazine compounds as obtained by condensation with unsymmetrical reagents of the type III (X=NH) can be separated only by repeated chromatographies as described above.

For the purification of the condensation products obtained by using either rifamycin O or rifamycin S, chromatography on polyamide columns or the fractionated adsorption-elution on polyamide powder according to the "batch process" can be used. The reaction mixtures, for instance the mixture of rifamycin PH and rifamycin B as obtained in the condensation of rifamycin O with phenylenediamine, are absorbed on polyamide from methanolic solutions and fractionated by elution with glacial acetic acid-methanol mixtures of varying composition.

When rifamycin O is used in the condensation, it may be advantageous to carry out the enrichment of the condensation product by fractionated extraction procedure based on the different acidity of the reaction products. For instance the excess of o-phenylenediamine and the rifamycin B formed in the condensation of rifamycin O with o-phenylenediamine may be extracted from an ethyl acetate solution of the reaction product at pH 3–3.5 and pH 7.3 respectively. The remaining ethyl acetate phase then contains almost pure rifamycin PH. In this process of enrichment it might be advantageous to reduce starting material still present, viz., rifamycin O to rifamycin B prior to separation, as the latter may be separated more easily from the desired condensation product than rifamycin O. The rifamycin B so obtained can be oxidized back to starting material viz. rifamycin O in a separate reaction stage.

On the other hand it is possible to oxidize back reduced starting material still present after reaction besides the requested condensation product, that is rifamycin B in the case that rifamycin O was used, and rifamycin SV in the case that rifamycin S was used, in the very reaction mixture without any separation or isolation, thus obtaining rifamycin O or S, respectively. The reaction can then be continued after further reagent, e.g., o-phenylenediamine, has been added.

For the said oxidations and reductions there are primarily used oxidizing agents such as ammoniumpersulfate or potassium ferricyanide and reduction agents such as ascorbic acid. The reduction or oxidation reactions may be carried out in a heterogeneous or a homogeneous medium. For instance, rifamycin SV as obtained besides rifamycin PH by the condensation of rifamycin S with o-phenylenediamine in benzene solution can be oxidized back to rifamycin S by shaking the benzene solution with an aqueous solution of potasium ferricyanide.

A crystallization may be made after the chromatographic purification of the condensation products. For this crystallization there are particularly suitable methanol, acetone, glacial acetic acid, acetone-ether, benzene-ether, methanol-water mixtures as well as 80% acetic acid. Mixtures of isomeric phenazine compounds very often form mixed crystals.

The compounds obtained from rifamycin O or S by the above process, either in the quinoid form corresponding to Formula IIb or in the hydroquinoid form corresponding to Formula IIa, may be converted into tetrahydroderivatives, wherein the two double bonds in 16, 17 and 18, 19 position of the condensation products are hydrogenated. This conversion may be effected by treatment with catalytically activated hydrogen, e.g., with hydrogen in the presence of a palladium catalyst, especially palladium on charcoal, or with Raney nickel.

The new compounds may be used, for example, in the form of pharmaceutical preparations that contain the new compounds in admixture with an organic or inorganic, solid or liquid excipient suitable for enteral, parenteral or local administration. Suitable excipients are substances that do not react with the new compounds, for example water, gelatin, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be for example, tablets, dragees, ointments, creams or capsules, or in liquid form solutions, suspensions or emulsions. They may be sterilised and/or may contain assistants such as preserving, stabilising, wetting or emulsifying agents, solution promoters, salts for regulating the osmotic pressure or buffers. They may also contain further therapeutically valuable substances. The preparations are formulated by the usual methods.

The new compounds may also be used in veterinary medicine, for example in one of the forms mentioned above. The following examples illustrate the invention. The temperatures are given in degrees centigrades.

The thin-layer chromatograms described in the Examples 1–9 are carried out on silica-gel in the system chloroform-acetone (15:1). Before development the plates were exposed for 15 seconds to acetic acid vapors.

The thin-layer chromatograms described in the Examples 10–27 and 30–33 are carried out on silica-gel in the system A or B.

System A: chloroform-methanol 100:3, plate is impregnated with citric acid (52 ml. 5% aqueous citric acid per 25 g. silica-gel).

System B: chloroform-acetone 5:1. The $R_f$-values are referred to the Rf-value of rifamycin O=1 and are designated herein with $Rf_{RO}$.

The constitution of the compounds obtained in the examples may be deduced by the formula given therein and which refers to the list of specific compounds on pages 3–4.

*Example 1*

A solution of 1.52 g. of rifamycin O in 150 ml. of chloroform is mixed with a solution of 0.22 g. of orthophenylenediamine in 200 ml. of methanol, with the mixture rapidly turning dark green. The batch is kept for 30 minutes at room temperature and then evaporated under vacuum at 20° C. The residue is dissolved in chloroform and the solution is filtered through a short column of silica-gel. After having evaporated the chloroform, a green powder is obtained which is purified by repeated reprecipitation from methanol-water (yield: 0.84 g.). The resulting powder is boiled for 30 minutes in a methanolic solution which is then evaporated under vacuum, and the residue is chromatographed on silica-gel with the system chloroform+acetone (10:1) containing 5% of glacial acetic acid. Those shares of the eluate which on addition of a caustic alkali solution turn from green to light-red are collected and evaporated, to leave behind a chromatographically pure condensation product of rifamycin O with ortho-phenylenediamine, which is designated as rifamycin-PH. Yield: 0.68 g. $Rf_{RO}=0.28$. Formula 1.

*Example 2*

A solution of 1.52 g. of rifamycin O and 0.29 g. of 4-chloro-ortho-phenylenediamine in 400 ml. of chloroform+methanol (1:1) is heated for a short time to the boil on a water bath, and the intensely dark-green solution is evaporated to dryness under vacuum. The residue is purified on silica-gel and by reprecipitation from methanol-water as described in Example 1. The resulting condensation product of rifamycin O with 4-chloro-ortho-phenylenediamine forms an amorphous green powder which proves to be unitary in thin-layer chromatography. $Rf_{RO}=1.1$. Formula 2.

*Example 3*

3.0 g. of rifamycin O are dissolved in 500 ml. of methanol, 0.5 g. of 2:3-diaminopyridine are added, and the whole is kept for 36 hours at room temperature. The dark-colored reaction mixture is then evaporated under vacuum and the residue purified by repeated chromatography on silica-gel. The system chloroform+acetone (10:1) produces at first brown-green eluates and then eluates of a pure blue color. Working up of all blue eluates yields 1.50 g. of a condensation product of rifamycin O with 2:3-diaminopyridine which is crystallised from aqueous methanol of 80% strength, to form violet-black crystals which give blue solutions in organic solvents. Yield: about 50%. Alkali turns the substance red. It melts at 175° C. with decomposition. $Rf_{RO}=0.30$. Formula 3.

*Example 4*

A solution of 0.76 g. of rifamycin O and 0.15 g. of 4:5-diamino-2-thiouracil in 100 ml. of chloroform is mixed with 300 ml. of methanol, and the whole is kept for 3 days at room temperature. The solution is then evaporated under vacuum, and the residue is chromatographed on silica-gel. Chloroform+acetone (10:1) elutes some yellow and reddish brown material, whereafter chloroform+acetate (5:1) elutes a pure, greenish blue condensation product of rifamycin O with 4:5-diamino-2-thiouracil. Yield: 390 mg. (about 50%). $Rf_{RO}=0.17$. Formula 4.

*Example 5*

A solution of 5.4 g. of rifamycin O in 150 ml. of chloroform is mixed with a solution of 0.8 g. of orthoaminophenol in 200 ml. of aqueous methanol of 75% strength, and the whole is refluxed on a water bath, during which the reaction mixture rapidly turns violet. After boiling the batch for 15 minutes, the solution, which meanwhile has turned claret, is evaporated under vacuum. The residue is dissolved in ether, filtered, and the ethereal solution is repeatedly agitated with an aqueous sodium carbonate solution and finally with a sodium chloride solution, dried over sodium sulfate and the ethereal solution is evaporated to yield 3.1 g. of a residue which contains two main products accompanied by impurities. To separate the mixture it is chromatographed on silica-gel in chloroform as eluant. After some initial, yellowish fractions, a violet product is eluted. All fractions of violet color are collected and repeatedly chromatographed to remove all traces of subsequent yellow and red substances. Finally, the product is twice reprecipitated from methanol-water to leave a violet powder which proves to be unitary in thin-layer chromatography. $Rf_{RO}=1.1$. When an aqueous methanolic solution is left to itself for some time, or when heated at the boil for a short time, it is transformed into the red-colored second main product of the mixture described above.

The second main product is also obtained by dissolving the residue (3.1 g.) mentioned above in 50% aqueous methanol and keeping this solution for 12 hours at room temperature. The solution is strongly diluted with sodium chloride solution and exhaustively extracted with ether. When the extract is twice chromatographed on 100 g. of silica-gel (Merck) (eluant:chloroform+acetone, 5%) each time, a red product results which is dissolved in 30 ml. of methanol (the solution is red) and an excess of ascorbic acid is run into the solution (color turns to brown). When more than 50 ml. of water are slowly added drop by drop, the hydroquinone form of the condensation product settles out in the form of black shiny crystals. All impurities have been transferred into the red-brown mother liquor. The crystals are shown to be pure in thin-layer chromatography. $Rf_{RO}=0.61$. Yield: 2.4 g. (about 45%). The product melts at 180° C. with decomposition (inflation). The product has the Formula 10'.

To prepare the sodium salt the crystals are suspended in a minimum of water, and an equivalent amount of N-sodium hydroxide solution is dropped in while stirring vigorously. While checking with a potentiometer the rate of the dropwise addition is adjusted so that the mixture is prevented from turning strongly alkaline. When all hydroxide solution has been added, all crystals are found to have dissolved. The claret-colored solution is filtered, and the dissolved sodium salt is isolated by freeze drying.

Example 6

A solution of 3.04 g. of rifamycin O and 0.58 g. of 4-chloro-2-aminophenol in 400 ml. of chloroform+methanol (1:1) is boiled for 15 minutes on a water bath. The solution is at first violet and then turns claret; it is evaporated, the residue dissolved in either, and the ethereal solution is repeatedly agitated with sodium carbonate solution and finally with a sodium chloride solution, dried over sodium sulfate and then evaporated. The residue is repeatedly chromatographed on silica-gel (eluant chloroform+acetone 15:1), whereby a violet and a red substance free from all impurities are obtained. When it is found difficult to remove yellow-colored impurities, reprecipitation of strongly enriched substances from methanol-water likewise yields pure products. The violet product is obtained in a poor yield; it has the $Rf_{RO}$ value 1.1. The red-colored condensation product is obtained in a yield of 45–50%; $Rf_{RO}=0.64$. When the violet product is boiled in aqueous methanol, it is transformed substantially quantitatively into the red product which latter corresponds to Formula 11.

Example 7

A solution of 1.52 g. of rifamycin O and 31 g. of 4-nitro-2-aminophenol in chloroform is mixed with 300 ml. of methanol and boiled for 30 minutes on a steam bath, then evaporated, and the residue is chromatographed with chloroform+acetone (10:1) on silica-gel. After having removed brown and yellow constituents, a material of brown-red color is obtained which as such is already considerably enriched. Reprecipitation from methanol-water removes the last impurities and yields a rust-colored powder which is revealed to be unitary in thin-layer chromatography (on silica-gel; chloroform+acetone 15:1). $Rf_{RO}=1.0$. Yield: 50 to 60%. The product corresponds to Formula 12.

Example 8

A solution of 1.52 g. of rifamycin O and 0.38 g. of 2-amino-6-chloro-5-nitrophenol in 50 ml. of chloroform is mixed with 300 ml. of methanol, and the solution is boiled for a short time on a water bath. The solution turns immediately dark red-brown; it is evaporated and the residue is chromatographed rapidly on silica-gel with chloroform+acetone (10:1). Since during this chromatography the reaction product is partially decomposed, the operation is brought to a close when the rust-red reaction product has become significantly enriched; it is then submitted to three reprecipitations from methanol-water and is obtained as a chromatographically pure red powder. $Rf_{RO}=1.0$. Yield: 60%. The product corresponds to Formula 13.

Example 9

A solution of 1.52 g. of rifamycin O and 0.31 g. of 3-hydroxy-anthranilic acid in 300 ml. of chloroform+methanol (1:1) is boiled for one hour, then evaporated, and the residue is repeatedly chromatographed on silica-gel with chloroform+acetone+glacial acetic acid (20:1:1). 0.780 g. of condensation product is isolated in the form of a polar brown substance (yield about 50%). $Rf_{RO}=0.42$. The product corresponds to Formula 14.

Example 10

400 ml. of methanol are added to a solution of 7.54 g. of rifamycin O and 1.59 g. of 1-amino-2-naphthol in 70 ml. of chloroform, and the reaction solution, which rapidly turns a dark color, is allowed to stand at room temperature until all the rifamycin O has reacted (thin-layer chromatogram). The batch is then highly concentrated in vacuo and allowed to stand. After some time blue-black shiny crystals of the condensation product crystallize out which, after being recrystallized from methanol, melt at 210–212° C. Yield: 3.7 g. $Rf_{RO}=0.91$ (System B). The product has the Formula 15.

Example 11

400 ml. of methanol are added to a solution of 7.54 g. of rifamycin O and 1.11 g. of 3-amino-2-hydroxytoluene in 70 ml. of chloroform, and the reaction mixture is allowed to stand at room temperature until all the rifamycin O has reacted (thin-layer chromatogram). The batch is then evaporated, the residue dissolved in methanol and the solution allowed to stand until the condensation product, which is at first violet-colored, changes into a red-color product. The condensation product is then precipitated with concentrated sodium carbonate solution, the precipitate filtered, washed with water and finally crystallized from methanol. After being recrystallized several times from methanol, there are obtained 3.5 g. of condensation product in the form of dark, brown-red crystals melting at 172–174° C. $Rf_{RO}=0.89$ (System B). Formula 16.

By reduction with ascorbic acid the compound may be converted into its hydroquinone (Formula 16') (cf., Example 5) which is obtained from methanol in the form of violet-black crystals melting at 183–184° C.

Example 12

7.54 g. of rifamycin O and 1.11 g. of 4-amino-3-hydroxytoluene are dissolved in 70 ml. of chloroform. 400 ml. of methanol are added to the solution and the mixture allowed to stand at room temperature until all the rifamycin O has reacted. The batch is then evaporated, the residue dissolved in methanol and the solution allowed to stand until the product initially formed has been completely transformed into a red colored condensation product. The red product is then precipitated with concentrated sodium carbonate solution and the precipitate chromatographed for the purpose of purification on 500 g. of silica-gel with the eluant chloroform+methanol (20:1). The red-colored condensation product crystallizes from aqueous methanol in the form of dark red rhombic plates melting at 185–187° C. $Rf_{RO}=0.98$ (System B). Yield: 3.0 g. Formula 17.

The substance may be transformed into its hydroquinone (Formula 17') with ascorbic acid by the method described in Example 5.

Example 13

From 7.54 g. of rifamycin O and 1.11 g. of 3-amino-4-hydroxytoluene there are obtained by the method described in Example 12, 2.80 g. of condensation product in the form of a red amorphous substance. $Rf_{RO}=0.98$ (System B). Formula 18.

The susbtance may be converted into its hydroquinone (Formula 18′) with ascorbic acid by the method described in Example 5.

Example 14

7.54 g. of rifamycin O and 1.10 g. of 3:4-di-aminotoluene are dissolved in 70 ml. of chloroform. 400 ml. of methanol are added to the solution and the mixture is allowed to stand at room temperature until all the rifamycin O has reacted. The batch is then evaporated in vacuo, the residue dissolved in methanol and the solution allowed to stand until the initially formed dirty green material is transformed as extensively as possible into a condensation product which has a red color in alkaline solution. The condensation product is precipitated several times from a methanol solution with sodium chloride solution and the so-purified material is purified by repeated chromatography on silica-gel pretreated with a chloroform solution containing 1% of glacial acetic acid using chloroform as eluant (containing 1% glacial acetic acid), to which a little acetone or methanol may be added gradually in the course of chromatography. Two isomeric dark green colored condensation products are obtained having the Formula 5.

The main quantity with the $Rf_{RO}$ value 0.42 (System A) crystallizes from acetic acid of 80% strength in the form of dark green, shiny crystal leaflets which melt at 199–201° C. Yield: 1.40 g.

The second isomer of $Rf_{RO}$ value 0.51 (System A) is also obtained in a pure form by this method. M.P. 192–193° C.

Example 15

7.54 g. of rifamycin O and 1.10 g. of 2:3-di-aminotoluene are dissolved in 70 ml. of chloroform. 400 ml. of methanol are added to the solution and the mixture is allowed to stand at room temperature until all the rifamycin O has reacted. The batch is worked up as described in Example 14. After careful chromatography the condensation product is obtained which is recrystallized from methanol, methanol+water and acetone. Dark green crystals melting at 190–191° C. are obtained. Yield: 2.7 g. $Rf_{RO}=0.51$ (System A). Formula 6.

The second isomer which is also obtained in a pure form in the course of chromatography and which is contained in the mother liquors after crystallization of the substance melting at 190–191° C. shows the $Rf_{RO}=0.64$ (System A).

Example 16

From 7.54 g. of rifamycin O and 1.24 g. of 2:3-diaminoethylbenzene there is obtained by the method described in Example 14 a mixture of isomeric condensation products which may be separated into its components by chromatography as described in Example 14. The isomer obtained as main product of $Rf_{RO}=0.53$ (System A) crystallizes from methanol and acetone to yield 2.5 g. of dark green crystals which melt at 180–181° C. Formula 7.

The second condensation product is contained in the mother liquor after crystallization of the isomer melting at 180–181° C. The product is obtained in pure form by chromatography as described above and shows the $Rf_{RO}=0.73$ (System A).

Example 17

From 7.14 g. of rifamycin O and 1.36 g. of 4:5-diamino-1:2-dimethylbenzene there is obtained by the method described in Example 14 a dark green colored condensation product which is purified by precipitation and chromatography. Yield: 2.8 g. $Rf_{RO}=0.43$ (System A). Formula 8.

Example 18

34.8 g. of rifamycin S are dissolved together with 5.4 g. of ortho-phenylenediamine in 750 ml. of benzene. The solution is allowed to stand until rifamycin S can no longer be detected in the reaction mixture by means of thin-layer chromatogram. This is the case after a few days. The benzolic reaction solution is then evaporated and the residue prepurified by being precipitated several times from methanol with water. After being subjected twice to chromatography on 300 and 1000 g. of silica-gel respectively (pretreated with a chloroform solution containing 1% pure acetic acid), using chloroform (containing 1% glacial acetic acid) as eluant, 15 g. of condensation product designated as rifamycin PH are obtained which crystallizes slowly from acetic acid of 80% strength. The chromatographically pure product forms small, dark green crystals melting at 181–183° C. $Rf_{RO}=0.53$ (System A). Formula 1.

Example 19

34.8 g. of rifamycin S are dissolved together with 6.1 g. of 3:4-diaminotoluene in 750 ml. of benzene. The solution is allowed to stand at room temperature until all the rifamycin S has reacted (thin-layer chromatogram). The reaction solution is then evaporated and the residue roughly prepurified by being precipitated several times from methanol with water. Repeated chromatography on silica-gel, pretreated with a chloroform solution containing 1% of pure acetic acid, with chloroform (containing 1% glacial acetic acid) as eluant, yields 9 g. of a pure condensation product of $Rf_{RO}$ value 0.42 (System A) which crystallizes from acetic acid of 80% strength in dark green, shiny leaflets and melts at 199–201° C. Formula 5.

In the portions which migrate more rapidly in the chromatogram are contained 4.5 g. of the isomeric condensation product of $Rf_{RO}$ value 0.51 (System A) in pure form. Formula 5.

Example 20

A solution of 34.8 g. of rifamycin S and 6.1 g. of 2:3-diaminotoluene in 750 ml. of benzene is allowed to stand at room temperature until the reaction is complete. The solution is then evaporated, the residue repeatedly precipitated from a mixture of methanol and water and the reaction product thus prepurified chromatographed in the way described in Example 18. A single chromatography on 1000 g. of silica-gel yields a crystalline product from which by repeated crystallization (alternately) from methanol, dilute methanol and acetone, the crystalline pure isomer with $Rf_{RO}=0.51$ in the System A may be obtained. Dark green rhombic plates melting at 190–191° C.: yield 10 g. Formula 6.

After evaporation the mother liquors yield a mixture of the two isomeric condensation products in which the second isomer of $Rf_{RO}=0.64$ (System A) is highly enriched. This second isomer may be obtained in pure form by chromatography as described above. Formula 6.

Example 21

34.8 g. of rifamycin S and 6.8 g. of 2:3-diaminoethylbenzene are reacted in a manner analogous to that described in Examples 18 to 20 to yield a condensation product from which the crystalline pure isomer of $Rf_{RO}=0.53$ (System A) is obtained by repeated crystallization (alternately) from methanol, dilute methanol and acetone. Dark green crystals melting at 180–181° C. Yield: 6 g. Formula 7.

After crystallization of the above isomer, the mother liquor, after evaporation, leaves behind 6.5 g. of crystalline material which consists of approximately equal parts of the two isomeric condensation products. By chromatography in the manner described above the isomer of $Rf_{RO}=0.73$ (System A) is obtained in a small quantity. Formula 7.

Example 22

A solution of 3.48 g. of rifamycin S and 0.79 g. of 1:2-diaminonaphthalene in 100 ml. of benzene is allowed to stand at room temperature until the rifamycin S has completely reacted. The solution is then evaporated, the residue recrystallized several times from a mixture of methanol and water and the so-prepurified reaction product chromatographed in the manner described in Examples 18–21 (silica-gel, chloroform with 1% pure acetic acid). By means of careful, repeated chromatography, the isomer which is formed in larger quantities ($Rf_{RO}=0.39$ in System A) may be obtained in chromatographically pure form and crystallized from methanol and dilute methanol. Dark green tetrahedral crystals melting at 205–210° C. Yield: 0.35 g. Formula 9.

Example 23

A solution of 3.48 of rifamycin S and 0.68 g. of 4:5-diamino-1:2-dimethylbenzene in 100 ml. of benzene is allowed to stand at room temperature until all of the rifamycin S has disappeared. The solution is then evaporated, the residue reprecipitated repeatedly from methanol-water and the so prepurified reaction product chromatographed in the manner described (silica-gel, chloroform with 1% acetic acid). A dark green condensation product of $Rf_{RO}=0.43$ (System A) is obtained. Formula 8.

Example 24

34.8 g. of rifamycin S and 5.45 g. of orthoaminophenol are dissolved together in 750 ml. of benzene. The solution is allowed to stand at room temperature until all the rifamycin S has reacted. The solution is evaporated to dryness, the residue dissolved in methanol and the solution again allowed to stand until the initially formed violet condensation product is completely transformed into a red product. The red condensation product is then precipitated by the addition of sodium carbonate solution to the methanolic solution of the reaction mixture, the precipitate is washed with water and the filtrate discarded which contains the main portion of contaminants. The red condensation product is purified by chromatography on 1000 g. of silica-gel with the eluant chloroform+acetone (20:1), the quantity of acetone being gradually increased to a ratio of 5:1.

In this manner there are obtained 16 g. of the amorphous red condensation product ($Rf_{RO}=0.98$; System B). (Formula 10). The product is converted into the crystalline hydroquinone by reduction with ascorbic acid (Example 5). The hydroquinone crystallizes from methanol in the form of black brown, shiny crystals melting at 180° C. Formula 10'.

0.211 g. of the red condensation product of $Rf_{RO}=0.98$ is hydrogenated in 40 ml. of alcohol with 0.6 g. of palladium carbon catalyst (10%). Hydrogenation is discontinued after 17.9 ml. of hydrogen have been taken up, the catalyst is filtered off and the filtrate diluted with a little water. Air is then passed through the solution until all the hydroquinone has been oxidized to quinone. The quinone is precipitated with water and repeatedly recrystallized from acetone. The pure compound is the 16, 17, 18, 19-tetrahydro derivative of the above quinone of $Rf_{RO}=0.98$. It crystallizes in the form of brick-red prisms melting at 260° C. Yield: 0.150 g. $Rf_{RO}=0.73$ (System B).

Example 25

A solution of 34.8 g. of rifamycin S and 6.15 g. of 3-amino-2-hydroxytoluene in 750 ml. of benzene is allowed to stand at room temperature until all the rifamycin S has reacted. The reaction solution is evaporated, the residue dissolved in methanol and the two condensation products formed during the reaction are precipitated with sodium carbonate solution. The precipitated material is filtered, washed with water and dissolved again in methanol. The methanolic solution is allowed to stand and the initially formed violet condensation product is gradually transformed into the more stable red condensation product which is slowly separated from methanol in large, coarse, brown-red crystals. For the purpose of complete purification the product is recrystallized four times from methanol to yield 19 g. of crystals melting at 172–174° C. $Rf_{RO}=0.89$ (System B). Formula 16.

The compound may be converted in the following manner into the hydroquinone:

The crystalline condensation product is dissolved at 60° C. in a just sufficient quantity of ethanol, the solution is allowed to cool somewhat and is then treated dropwise with an aqueous alcoholic solution of ascorbic acid (excess). After a short time crystals of the hydroquinone separate which may be recrystallized from methanol. The hydroquinone melts at 183–184° C. Formula 16'.

Example 26

A solution of 11.60 g. of rifamycin S and 2.05 g. of 4-amino-3-hydroxytoluene in 200 ml. of benzene is allowed to stand at room temperature until all the rifamycin S has reacted. The solution is then evaporated, the residue dissolved in methanol and again allowed to stand until the initially formed violet condensation product is completely transformed into the more stable red condensation product. The red product is precipitated from its methanolic solution by sodium carbonate solution, filtered, washed with water and for the purpose of complete purification chromatographed on 400 g. of silica-gel (eluant chloroform+acetone 20:1). 4 g. of red-colored condensation product, $Rf_{RO}=0.98$ (System B) are obtained. Formula 17. The red condensation product may be converted into its hydroquinone by reduction with ascorbic acid as described in Example 5. Formula 17'.

Example 27

In an analogous manner to that described in Example 26 from 11.60 g. of rifamycin S and 2.05 g. of 3-amino-4-hydroxytoluene there are obtained 4.5 g. of a red condensation product of $Rf_{RO}=0.98$ (System B). Formula 18. With ascorbic acid the corresponding hydroquinone may be obtained. Formula 18'.

Example 28

40 g. of rifamycin S (spectrophotometric titer 92%) recrystallized from absolute alcohol, are dissolved in 4 liters of ether which has been dried over sodium sulfate, and the solution kept at room temperature for 64 hours. The crystal magma (29.7 g.) which has formed during this time is suctioned off. According to the ultraviolet absorption spectrum, the filtrate contains but a small quantity of the condensation product, rifamycin PH, in addition to rifamycin SV. The filtrate is discarded and the filter residue which, according to polarographic analysis has a 58% content of rifamycin PH, dissolved in 6.5 liters of ethyl acetate, and the solution extracted in a separatory funnel 18 times with 4 liters of phosphate buffer pH 6.24 each time. During these extractions, a total of 2.4 liters of ethyl acetate are added. Before the last two extractions, 1.5 liters of hexane are added to remove the rifamycin SV completely from the organic phase. Each extract is checked analytically by spectrophotometry and thin-layer chromatography. On completion of the extraction, the volume is 8.2 liters of ethyl acetate solution which according to spectrophotometric analysis contain 15.3 g. of rifamycin PH (Formula 1).

This solution is treated with 6 ml. of sodium methylate having a sodium content of 8.9% and 2.5 liters of ligroin. The solution is concentrated under reduced pressure to a volume of about 1 liter to obtain in this manner a first crystallizate of the sodium salt of rifamycin PH (13 g.). From the mother liquors 2 further crystallizates are obtained. Analysis of the various fractions reveals the following titers of free rifamycin PH:

First crystallizate—3 g.; polarographic titer: 84.4%, spectrophotometric titer: 91.8%.
Second crystallizate—1.4 g.; polarographic titer: 86.4%.
Third crystallizate—1.4 g.; polarographic titer: 44.4%.

The spectrophotometric and polarographic data for rifamycin PH and rifamycin SV are as follows:

|  | UV spectrum in phosphate buffer pH 7.38 | | Polarography in 50% MeOH+50% acetate buffer pH 5.4 |
| --- | --- | --- | --- |
|  | m/μ | $E^{1\%}_{1\ cm.}$ |  |
| Rifamycin SV | 314 | 308 | Anodic wave. |
|  | 445 | 204 | $E\ \frac{1}{2}=+0.03\ V.$ |
| Rifamycin PH | 343 | 331 | Cathodic wave. |
|  | 515–520 | 90 | $E\ \frac{1}{2}=-0.33\ V.$ |

*Example 29*

In 3.5 liters of analytically pure methanol in a four-necked flask equipped with a glass stirrer, a reflux condenser, a thermometer, and a gas inlet tube, are suspended 100 g. of rifamycin O that have been recrystallized from methanol (spectrophotometric titer at least 95%). The suspension is stirred while being cooled externally with ice until the internal temperature has reached 0–2° C.

For complete de-aeration of the solvent, a moderate stream of nitrogen is simultaneously passed through for 40–45 minutes. With cooling and continuous stirring, 42 ml. of a methanolic solution of sodium methylate having 7.3% sodium content (the quantity calculated on 100% rifamycin O) are gradually added. Nitrogen is passed through for another 15 minutes. The flask is then covered with black paper and the contents treated with 15 g. of ortho-phenylenediamine, recrystallized as described below (5% in excess of theoretical quantity). The mixture is stirred on and cooled for 50 minutes while nitrogen is passed through. Then follows chromatographic determination whether reaction is complete. To this end plates made from silica-gel G by the method of Stahl are used, and acetone is used as solvent (rifamycin O produces a gray-yellowish spot and has an Rf value of 0.55; rifamycin PH has an Rf value of 0.65 and produces an elongated violet spot; rifamycin B, finally, has an Rf value between 0 and 0.4 and gives an elongated intensive yellow spot.

If rifamycin O has not reacted completely, the operation must be continued. When the reaction is complete, the solution is poured into 15 liters of water containing 50 g. of sodium ascorbate for reduction of any traces of rifamycin O to rifamycin B.

The batch is stirred for 3 to 5 minutes, then acidified with 10% hydrochloric acid to pH 3–3.5, and extracted with one portion of 12 liters of ethyl acetate, purified over phosphorus pentoxide (refluxed for 2 hours over 2% phosphorus pentoxide). The batch is shaken for about 20–25 minutes, and the slightly colored aqueous phase is discarded. For removal of any ortho-phenylenediamine that may still be present, the organic phase is washed twice in succession with 2 liters and 0.5 liter of acidified water (pH 2.5–3).

The organic phase is then treated once with 5 liters and then with 2.5 liters of phosphate buffer pH 7.3 (1/15 molar). When chromatographic investigation of the organic layer as described above shows the presence of rifamycin B, a third extraction with one liter of the buffer mentioned is performed. From the combined aqueous extracts, Rifamycin B can be recovered.

The organic phase is then dried over sodium sulfate, filtered, and concentrated to a volume of 300–400 ml. under reduced pressure at a temperature of 30–35° C. The residue is allowed to stand for 24 hours at 5–10° C. during which time a crystal magma separates. The latter is filtered off with suction, washed twice with a small amount of ethyl acetate that has been purified as described above, and dried at 40° C. under reduced pressure.

There are obtained 35.5 g. of crystalline, dark green rifamycin PH having a spectrophotometric titer between 90 and 95% (yield 32–36%).

PREPARATION OF THE SODIUM SALT 35.5 g. of rifamycin PH having a titer of 92.5% (corresponding to 32.8 g. of 100% rifamycin PH) are dissolved in 160 ml. of methanol. At a temperature not exceeding 20° C. the resulting solution is treated with 15.3 ml. of a methanolic solution of sodium methylate having a sodium titer of 6.5% (corresponding to an excess of 3% over the calculated quantity). The solution of the sodium salt so obtained is diluted with 1.3 liters of ethyl acetate and the mixture concentrated to a volume of about 200–250 ml. The residue is then treated with 0.5 liter of ethyl acetate and 0.4 liter of cyclohexane, and the whole then evaporated to a volume of about 200 ml. The sodium salt precipitates during evaporation already. For complete separation, the batch is allowed to stand at 4–5° C. for 12 hours. The violet-colored salt is filtered off with suction and washed exhaustively with n-hexane. The product is then dried in vacuo at 35–40° C. for 48 hours.

Yield: 31.4 g.; spectrophotometric titer (referred to the acid): about 90%. Yield referred to the acid: about 85%.

The salt dissolves in water up to a concentration of 15–20%. The solution has an intense red color. The ortho-phenylenediamine used is prepared as follows: 33 g. of technical grade ortho-phenylenediamine are dissolved in 115–120 ml. of boiling water which contains 1 g. of sodium hydrosulfite. Animal carbon is added in a proportion of 10% of the ortho-phenylenediamine used, and the batch filtered, cooled with ice in the dark, and the white crystalline product filtered off after 2–3 hours. It is washed with a small quantity of cold water, dried for 24 hours in vacuo in the dark at 40° C. 28 g. of the pure product are obtained which melt at 100–101° C. This purification must not be performed more than 20–30 hours before the product is used.

*Example 30*

A solution of 44.0 g. of rifamycin O in 150 ml. of chloroform and 1000 ml. of methanol are mixed with a solution of 6.25 g. of ortho-phenylenediamine in 1000 ml. of methanol. The mixture is allowed to stand for five days. After that time it no longer contains any rifamycin O, but it contains rifamycin PH in addition to rifamycin B. The mixture is concentrated under reduced pressure to a volume of about 200 ml. and chromatographed over 1 kg. of polyamide powder marketed under the registered trade name Ultramid BM228.

Rifamycin B appears as a yellow zone and rifamycin PH as a red zone. Washing with methanol is performed until the eluate is nearly colorless. Rifamycin PH is then eluted with methanol containing 3% of acetic acid. After that, the rifamycin B forming a yellow band in the column can be recovered by elution with methanol containing 30% of acetic acid. The green-colored eluate containing rifamycin PH is evaporated to dryness under reduced pressure. For crystallization, the green amorphous residue is dissolved in 100 ml. of glacial acetic acid. After a few hours, 19 g. of pure rifamycin PH crystallize. The substance is recrystallized several times from benzene+ether or acetone+ether to obtain crystals of melting point 183–184° C. (Kofler heater). Rifamycin PH forms black, lustrous crystals taking the shape of elongated prisms or lamellae which on trituration assume a dirty yellowish green color. Rifamycin PH dissolves readily in methanol, chloroform and acetonitrile, less readily in acetone, glacial acetic acid, benzene, methylenechloride and dioxane, and sparingly in ether, cyclohexane, hexane, and water. The solution of rifamycin PH in acetic acid is green, whereas the solution in dioxane is blue. With alkalis, rifamycin PH forms red salts the aqueous solutions of which show a neutral reaction.

Example 31

A solution of 3.48 g. of rifamycin S and 0.81 g. of 6,7-diamino-1,2,3,4-tetrahydronaphthalene in 100 ml. of benzene is allowed to stand at room temperature until all of the rifamycin S has reacted. The reaction mixture is evaporated, the residue dissolved in methanol, and the methanolic solution filtered through a column of 100 g. of the polyamide powder used in Example 30. The batch is washed with methanol until the filtrate runs nearly colorless. By washing the polyamide with methanol containing 3% acetic acid, a green eluate is obtained which on evaporation leaves behind 1.57 g. of a pure condensation product $Rf_{RO}=0.53$ (System A). Formula 19.

Example 32

A solution of 3.04 g. of 16, 17, 18, 19-tetrahydro-rifamycin S of melting point 226–228° C. and 0.45 g. of ortho-phenylene-diamine in 100 ml. of benzene is allowed to stand at room temperature until all of the tetrahydro-rifamycin S has reacted. The reaction mixture is evaporated, the residue dissolved in methanol, and the methanolic solution filtered through a column of 100 g. of the polyamide powder used in Example 30. Washing with methanol follows until the filtrate runs nearly colorless. By washing the column with methanol containing 3% acetic acid a blue-green eluate is obtained which on evaporation leaves behind 1.2 g. of a pure condensation product. The substance is recrystallized several times from methanol and from acetone: 950 mg. of black lustrous crystals of melting point 188–189° C. Molecular weight determined by mass spectrometry: 788 (calculated, 788). $Rf_{RO}=0.70$ (System A).

The 16, 17, 18, 19-tetrahydro-rifamycin PH formed by hydrogenation of rifamycin PH (cf., Example 33) is identical with the condensation product from 16, 17, 18, 19-tetrahydro-rifamycin S and ortho-phenylenediamine described above, as evidenced by melting point, mixed melting point and thin-layer chromatography. Formula 20.

The 16, 17, 18, 19-tetrahydro-rifamycin S used as starting material is prepared as follows:

5.0 g. of rifamycin SV in 150 ml. of alcohol is hydrogenated at room temperature and atmospheric pressure with the use of 0.5 g. of 10% palladium carbon. Hydrogenation is discontinued after the uptake of 311 ml. of hydrogen, the catalyst filtered off, the methanolic solution diluted with phosphate buffer of pH 7. An excess of ammonium persulfate solution is then added and the batch allowed to stand for some time. The material that has separated is suctioned off and crystallized several times from methanol. 2 g. of 16, 17, 18, 19-tetrahydro-rifamycin S are obtained in the form of elongated yellow prisms of melting point 226–228° C.

Example 33

0.784 g. of rifamycin PH in 250 ml. of ethanol is hydrogenated at room temperature under atmospheric pressure with the use of 200 mg. of 10% palladium carbon. After the uptake of 67.5 ml. of hydrogen (3 mols) the catalyst is filtered off, and a vigorous current of air is passed through the solution for 20 minutes. The solution is then evaporated. According to the thin-layer chromatogram, the residue consists of five components having a blue to blue-grey color. In order to separate the 16, 17, 18, 19-tetrahydro-rifamycin PH, the mixture is chromatographed several times over silica-gel washed with acid, using chloroform as eluant. There is obtained 0.19 g. of pure substance of $Rf_{RO}=0.70$ (System A) which is recrystallized from acetone and methanol. According to melting point, mixed melting point and $Rf_{RO}$ value, this substance is identical with the 16, 17, 18, 19- tetrahydro-rifamycin PH obtained from 16, 17, 18, 19-tetrahydro-rifamycin S by condensation with ortho-phenylene-diamine. Formula 20.

Example 34

2.8 g. rifamycin S are heated on a boiling water bath with 0.50 g. o-phenylenediamine in 200 ml. of toluene under an atmosphere of nitrogen. After an hour there is added to the reaction mixture further 0.15 g. o-phenylenediamine and heating is continued until all rifamycin S has disappeared. After cooling the toluene solution, it is shaken with a solution containing an excess of potassium ferricyanide. After having filtered through celite to remove amorphous material and to facilitate the separation of the two phases, the toluene solution is washed with sodium chloride solution. There is then added 0.25 g. of o-phenylenediamine and heating on the water bath in a nitrogen atmosphere is resumed. After an hour there is further added 0.04 g. o-phenylenediamine and heating is continued until all rifamycin has disappeared. The whole oxidation process is then repeated; there is added another 0.12 g. o-phenylene-diamine and heating is continued for about two hours. The solution is then shaken with 2 N-hydrochloric acid and with sodium chloride solution and is evaporated to dryness. The residue is dissolved in methanol and rifamycin PH is isolated as described in Example 30. 1.85 g. rifamycin PH are obtained, yield about 66%.

Example 35

Pharmaceutical antibiotic preparations for parenteral use containing rifamycin PH as active ingredient: 25 mg. of rifamycin PH-sodium salt are dissolved in 1 ml. of distilled water. This solution is lyophilized at −30° C. The dry compound thus obtained is diluted with, e.g., 50 ml. of distilled water or 100 ml. of physiological sodium chloride solution. These solutions are used for the parenteral administration of the antibiotic.

Example 36

Pharmacetutical preparation containing rifamycin PH as antibiotic in the form of tablets.

Composition:                                          Mg.
  Rifamycin PH _____ 500
  Wheat starch _____ 35
  Silicic acid aerogel compositum _____ 30
  Gelatine _____ 6
  Arrow root _____ 30
  Talc _____ 18
  Magnesium stearate _____ 6
                                                      ───
                                                      625

Manufacture:
(1) the gelatine is dissolved in 10 times its weight of water by warming on a water bath
(2) rifamycin PH and wheat starch are mixed in a suitable kneading machine, and the gelatine solution (1) and water are added so as to obtain a plastic wet mass. There is then mixed in in little portions the silicic acid aerogel compositum; the mass is then passed through a sieve of 3–5 mm. mesh and dried not above 40° C.
(3) The dried granulate (2) is passed through a sieve C. 8–1 mm. mesh and is finally mixed with arrow root, talc and magnesium stearate.
(4) The granulate (3) is then compressed into tablets of 11.5 mm. diameter in the usual manner.

Example 37

Pharmaceutical preparation containing rifamycin PH in the form of hard-gelatine capsules.

Composition:                                          Mg.
  Rifamycin PH _____ 250
  Ethyl-cellulose _____ 5
  Stearic acid _____ 5
                                                      ───
                                                      260

Manufacture:
(1) The ethyl cellulose and the stearic acid are dissolved in 20 times their weight of methylene chloride.
(2) Rifamycin PH is mixed with solution (1) to form a homogeneous mass and this is passed through a sieve of 3–5 mm. mesh at a temperature not exceeding 40° C.
(3) The granulate (2) is passed through a sieve of 0.5 mm. mesh and filled into hard gelatine capsules of size 1 (=0.5 cm.²).

What is claimed is:
1. A member selected from the group consisting of a compound of the formulae

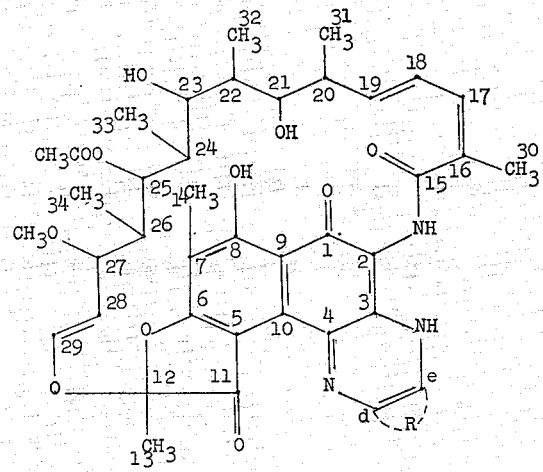

and

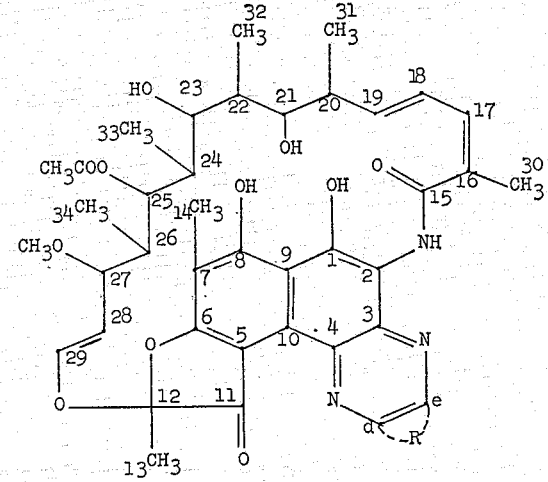

one of the partial formulae

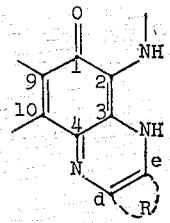

IIa and

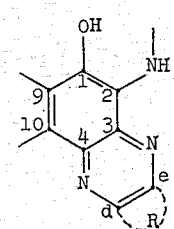

IIb in which R represents, together with the carbon atoms d and e, a member selected from the group consisting of

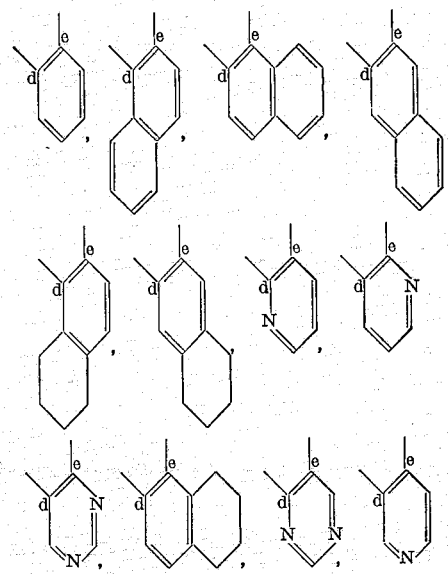

and of such groupings substituted at the carbon atoms by at least one member selected from the group consisting of a hydroxy, a mercapto, a lower alkyl, a lower alkoxy, a lower alkylthio, a nitro, an amino, a carboxyl, a sulfo, a cyano group and a halogen atom, and a 16, 17, 18, 19-tetrahydro derivative thereof and a metal salt and an acid addition salt of any of these compounds.

2. A hydroquinone corresponding to a compound of Formula IIa as claimed in claim 1.

3. A member selected from the group consisting of a compound of the formulae

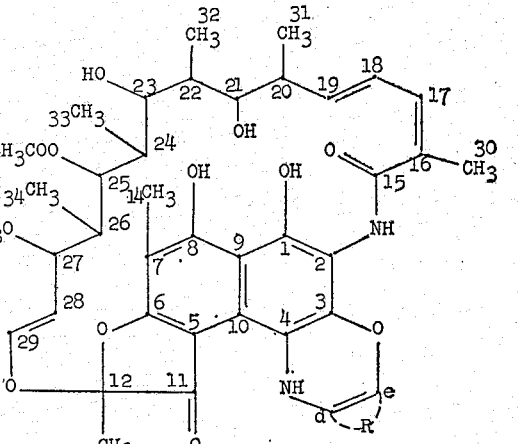

and

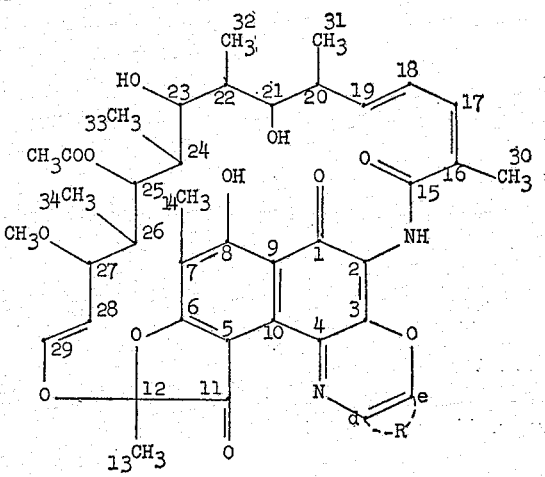

one of the partial formulae

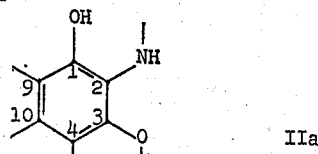 IIa and

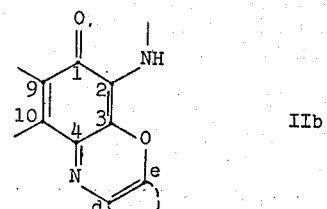 IIb in which R represents, together with the carbon atoms $d$ and $e$, a member selected from the group consisting of

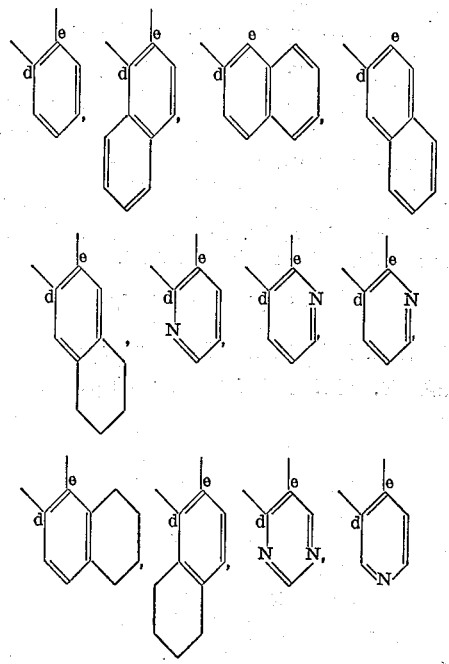

and of such groupings substituted at the carbon atoms by at least one member selected from the group consisting of a hydroxy, a mercapto, a lower alkyl, a lower alkoxy, a lower alkylthio, a nitro, an amino, a carboxyl, a sulfo, a cyano group and a halogen atom, and a 16, 17, 18, 19-tetrahydro derivative thereof and a metal salt and an acid addition salt of any of these compounds.

4. Rifamycin PH, a compound of one of the Formulae IIa and IIb according to claim 1, wherein $ed$R=phenylene.

5. The soduim salt of the compound of claim 4.

6. The 16, 17, 18, 19-tetrahydro derivative of the compound of claim 4.

7. The compound of one of the Formulae IIa and IIb according to claim 1, wherein $ed$R=phenylene substituted by methyl in p-position to one of the carbon atoms $d$ and $e$, which compound has a melting point of 199–201° C.

8. The compound of one of the Formulae IIa and IIb according to claim 1, wherein $ed$R=phenylene substituted by methyl in p-position to one of the carbon atoms $d$ and $e$, which compound has a melting point of 192–193° C.

9. The compound of one of the Formulae IIa and IIb according to claim 1, wherein $ed$R=phenylene substituted by methyl in o-position to one of the carbon atoms $d$ and $e$, which compound has a melting point of 190–191° C.

10. The compound of one of the Formulae IIa and IIb according to claim 1, wherein $ed$R=phenylene substituted by methyl in o-position to one of the carbon atoms $d$ and $e$ which compound has an R$f$ value of 0.64 referred to the R$f$-value of rifamycin O=1, when thin layer chromatograms are made on silicagel in the system chloroform+methanol 100:3, the plate being impregnated with citric acid in the ratio of 52 ml. 5%-aqueous citric acid solution per 25 g. silicagel.

11. The compound of one of the Formulae IIa and IIb according to claim 1, wherein $ed$R=phenylene substituted by ethyl in o-position to one of the carbon atoms $d$ and $e$, which compound has a melting point of 180–181° C.

12. The compound of one of the Formulae IIa and IIb according to claim 1, wherein $ed$R=phenylene substituted by ethyl in o-position to one of the carbon atoms $d$ and $e$, which compound has an R$f$-value of 0.73 referred to the R$f$-value of rifamycin O=1, when thin layer chromatograms are made on silicagel in the system chloroform-methanol 100:3, the plate being impregnated with citric acid, in the ratio of 52 ml. 5%-aqueous citric acid solution per 25 g. silicagel.

13. The compound of one of the Formulae IIa and IIb according to claim 1, wherein $ed$R=phenylene substituted in each of the p-positions to $e$ and $d$ by methyl.

14. The compound of one of the Formulae IIa and IIb according to claim 1, wherein $ed$R=naphthylene, which compound has a melting point of 205–210° C.

15. The compound of Formula IIb according to claim 1, wherein $ed$R=phenylene.

16. The compound of Formula IIb according to claim 3, wherein $ed$R=phenylene substituted by chlorine in p-position to $e$.

17. The compound of Formula IIb according to claim 3, wherein $ed$R=phenylene substituted by a nitro group in p-position to $e$.

18. The compound of Formula IIb according to claim 3, wherein $ed$R=phenylene substituted by chlorine in o-position to $e$ and by a nitro group in p-position to $d$.

19. The compound of Formula IIb according to claim 3, wherein $ed$R=naphthylene of the formula

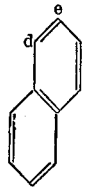

20. The compound of Formula IIb according to claim 3, wherein $ed$R=phenylene substituted by methyl in o-position to $e$.

21. The compound of the Formula IIb according to claim 3, wherein $ed$R=phenylene substituted by methyl in p-position to $d$.

22. The compound of the Formula IIb according to claim 3, wherein $ed$R=phenylene substituted by methyl in p-position to $e$.

23. The compound of one of the Formulae IIa and IIb according to claim 1, wherein $ed$R=tetrahydronaphthylene of the formula

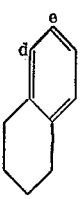

24. Process for the manufacture of new antibiotically active compounds, wherein a member selected from the group consisting of rifamycin O and rifamycin S and a 16, 17, 18, 19-tetrahydro derivative of these compounds is reacted with a compound of the formula

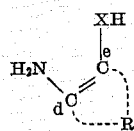

in which X represents a member selected from the group consisting of NH and O, and R represents together with the carbon atoms $d$ and $e$ a member selected from the group consisting of

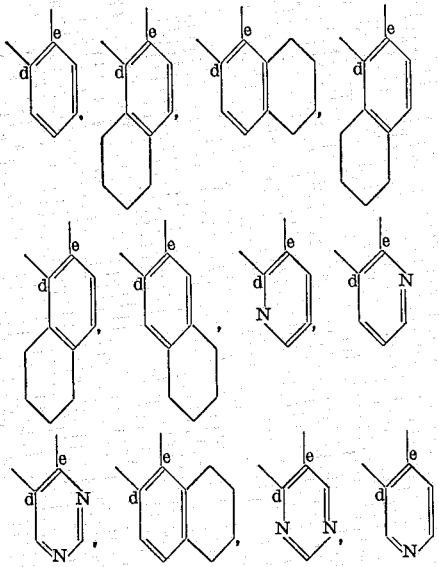

and of such groupings substituted at the carbon atoms by at least one member selected from the group consisting of a hydroxy, a mercapto, a lower alkyl, a lower alkoxy, a lower alkylthio, a nitro, an amino, a carboxyl, a sulfo, a cyano group and a halogen atom.

25. Process according to claim 24, wherein a hydroquinone obtained is oxidized to the corresponding quinone with the aid of air.

26. Process according to claim 24, wherein a quinone obtained is reduced to the corresponding hydroquinone with the aid of ascorbic acid.

27. Process according to claim 24, wherein a compound obtained is reduced with catalytically activated hydrogen to its 16, 17, 18, 19-tetrahydro derivative.

28. Process according to claim 26, wherein a compound obtained is reduced with catalytically activated hydrogen to its 16, 17, 18, 19-tetrahydro derivative.

29. Process according to claim 24, wherein the reaction is effected with rifamycin O in the presence of a polar solvent.

30. Process according to claim 24, wherein the reaction is carried out with rifamycin S in a non-polar solvent.

31. Process according to claim 24, wherein the reaction product is purified by chromatography on polyamide column.

32. Process according to claim 24, wherein the reaction product is purified by adsorption elution on polyamide powder according to the "batch process."

33. Process according to claim 24, wherein after termination of the reaction there is added to the reaction mixture a member selected from the group consisting of ammonium persulfate and potassium ferricyanide so as to oxidize the reduction products of the rifamycin used as starting material and the reaction is continued by the further addition of the other reactant.

No references cited.

WALTER A. MODANCE, *Primary Examiner.*
ROBERT T. BOND, *Assistant Examiner.*

CERTIFICATE OF CORRECTION

Patent No. 3,338,888

August 29, 1967

Hans Bickel et al.

It is certified that error appears in the above identified patent and that said Letters Patent are hereby corrected as shown below:

Column 3, line 7, cancel "mula"; line 9, "for-" should read -- formula --. Column 6, line 41, "absorbed" should read -- adsorbed --. Column 11, line 70, "7.14" should read -- 7.54 --. Column 15, line 49, "yelllow" should read -- yellow --. Column 18, line 62, "C.8" should read -- 0.8 --. Column 19, to the right of the first formula insert -- IIb --; to the right of the second formula insert -- IIa --; lines 55 to 75, cancel the last two formulas. Column 20, to the right of the first formula of claim 3, insert -- IIa --; same column 20, to the right of the second formula, insert --IIb --. Column 21, lines 1 to 20, cancel the first two formulas; lines 33 to 38, the right-hand portion of the formula reading

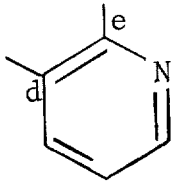   should read   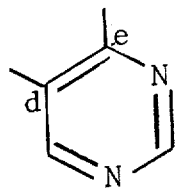

Column 23, lines 13 to 23, the formulas should appear as shown below:

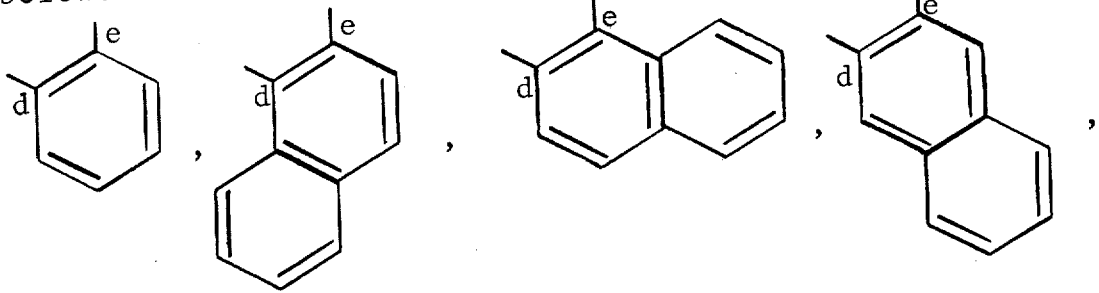

Signed and sealed this 2nd day of December 1969.

(SEAL)
Attest:

EDWARD M. FLETCHER, JR.
Attesting Officer

WILLIAM E. SCHUYLER, JR
Commissioner of Patents